(12) United States Patent
Lee

(10) Patent No.: US 10,978,008 B2
(45) Date of Patent: Apr. 13, 2021

(54) ELECTRONIC DEVICE INCLUDING OPTICAL MEMBERS THAT CHANGE THE OPTICAL PATH

(71) Applicant: Samsung Electronics Co., Ltd., Suwon-si (KR)

(72) Inventor: Donghi Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/671,756

(22) Filed: Nov. 1, 2019

(65) Prior Publication Data

US 2020/0143759 A1 May 7, 2020

(30) Foreign Application Priority Data

Nov. 2, 2018 (KR) .................. 10-2018-0133633

(51) Int. Cl.
*G09G 3/36* (2006.01)
*G02B 27/28* (2006.01)
*G02B 27/01* (2006.01)

(52) U.S. Cl.
CPC .......... *G09G 3/36* (2013.01); *G02B 27/0172* (2013.01); *G02B 27/281* (2013.01); *G02B 2027/0134* (2013.01); *G02B 2027/0178* (2013.01)

(58) Field of Classification Search
CPC ...... G09G 3/36; G02B 27/0172; G02B 27/28; G02B 27/281; G02B 2027/0132; G02B 2027/0134; G02B 2027/0136; G02B 2027/0178
See application file for complete search history.

(56) References Cited

U.S. PATENT DOCUMENTS

| 6,246,383 | B1 * | 6/2001 | Ophey ............... G02B 27/0172 345/8 |
| 6,657,602 | B2 | 12/2003 | Endo et al. |
| 6,989,935 | B2 * | 1/2006 | Domjan ............. G02B 27/0172 359/630 |
| 7,990,610 | B2 | 8/2011 | Higuchi et al. |
| | | | (Continued) |

FOREIGN PATENT DOCUMENTS

KR 10-0278696 B1 1/2001

OTHER PUBLICATIONS

International Search Report dated Feb. 21, 2020, issued in the International Application No. PCT/KR2019/014747.

*Primary Examiner* — Tom V Sheng
(74) *Attorney, Agent, or Firm* — Jefferson IP Law, LLP

(57) ABSTRACT

An electronic device is provided. The electronic device includes a display including a light source configured to emit light, a first light transfer member located on a first optical path of the light and configured to transfer the light of the first optical path to a second optical path and a third optical path, a driver configured to drive the first light transfer member, a second light transfer member disposed on the second optical path and configured to transfer light incident via the second optical path to the outside of the electronic device, and a third light transfer member disposed on the third optical path and configured to transfer light incident via the third optical path to the outside of the electronic device. The second optical path and the third optical path may be substantially symmetrical with respect to the first optical path.

20 Claims, 17 Drawing Sheets

(56) References Cited

U.S. PATENT DOCUMENTS

| | | | | |
|---|---|---|---|---|
| 8,164,620 B2* | 4/2012 | Hsu | ............... | H04N 13/337 |
| | | | | 348/51 |
| 9,971,150 B1 | 5/2018 | Robbins | | |
| 10,175,489 B1* | 1/2019 | Robbins | ............... | G01S 7/499 |
| 2008/0165407 A1* | 7/2008 | Ishibashi | ............ | G02B 27/1046 |
| | | | | 359/238 |
| 2009/0027772 A1* | 1/2009 | Robinson | ............ | H04N 13/344 |
| | | | | 359/472 |
| 2010/0296060 A1 | 11/2010 | Huang | | |
| 2014/0320755 A1* | 10/2014 | Martinez | ............... | G02B 5/30 |
| | | | | 349/11 |
| 2015/0378074 A1* | 12/2015 | Kollin | ............... | G02B 5/3016 |
| | | | | 349/185 |
| 2017/0059879 A1* | 3/2017 | Vallius | ............... | G02B 27/0081 |
| 2017/0311796 A1* | 11/2017 | Walsh | ............... | A61B 3/0058 |
| 2017/0336639 A1 | 11/2017 | Gao et al. | | |
| 2020/0004018 A1* | 1/2020 | Lee | ............... | G02B 5/3083 |
| 2020/0081530 A1* | 3/2020 | Greenberg | ............ | G06T 19/006 |

* cited by examiner

ELECTRONIC DEVICE INCLUDING OPTICAL MEMBERS THAT CHANGE THE OPTICAL PATH

CROSS-REFERENCE TO RELATED APPLICATION(S)

This application is based on and claims priority under 35 U.S.C. § 119(a) of a Korean patent application number 10-2018-0133633, filed on Nov. 2, 2018, in the Korean Intellectual Property Office, the disclosure of which is incorporated by reference herein in its entirety.

BACKGROUND

1. Field

The disclosure relates to an electronic device including optical members which change an optical path. More particularly, the disclosure relates to an augmented reality (AR) electronic device which transfers content to both eyes through an optical path having the same length from the both eyes by using a light transfer member which transfers to both sides the light emitted from the display.

2. Description of Related Art

Augmented Reality (AR) electronic devices may show a single image by superimposing a 3-Dimensional (3D) virtual image on an image or background of reality recognized by a user. Virtual Reality (VR) electronic devices may make a virtual world into an image to show it to the user.

AR electronic devices or VR electronic devices in the form of eyeglasses may reflect information transferred from a display and then transfer it to eyes of the user. In addition, the electronic device may transfer an image to both eyes. In case of transferring the image to the both eyes, a display panel for emitting light transferred to each eye may be disposed to a portion of an eyeglass frame or an upper portion of a lens.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an augmented reality (AR) electronic device which transfers content to both eyes through an optical path having the same length from the both eyes by using a light transfer member which transfers to both sides the light emitted from the display.

An electronic device which transfers an image to both eyes has a display device and an optical member disposed around both eyes, respectively. When two display devices are disposed and the optical member is disposed around the both eyes or a portion of an eyeglass frame, the AR electronic device increases in volume and weight.

When light emitted from the two displays is transferred to the both eyes, there is a slight difference even if each display is the same product. Therefore, there is distortion in an image recognized by a user.

Additional aspects will be set forth in part in the description which follows and, in part, will be apparent from the description, or may be learned by practice of the presented embodiments.

In accordance with an aspect of the disclosure, an electronic device is provided. The electronic device includes a display including a light source configured to emit light, a first light transfer member located on a first optical path of the light and configured to transfer the light of the first optical path to a second optical path and a third optical path, a driver configured to drive the first light transfer member, a second light transfer member disposed on the second optical path and configured to transfer light incident via the second optical path to the outside of the electronic device, and a third light transfer member disposed on the third optical path and configured to transfer light incident via the third optical path to the outside of the electronic device. The second optical path and the third optical path are substantially symmetrical with respect to the first optical path.

In accordance with another aspect of the disclosure, an electronic device is provided. The electronic device includes a display including a light source configured to emit light, a first light transfer member located on a first optical path of the light and configured to transfer the light of the first optical path to a second optical path and a third optical path, a driver configured to drive the first light transfer member, a second light transfer member disposed on the second optical path changed by the first light transfer member and configured to transfer light incident via the second optical path to the outside of the electronic device, a third light transfer member disposed on the third optical path changed by the second light transfer member and configured to transfer light incident via the third optical path to the outside of the electronic device, and at least one processor, electrically coupled with the driver and the display, configured to control an operation of the driver and the display.

An electronic device according to various embodiments includes one display to reduce volume and weight of the electronic device.

An electronic device according to various embodiments matches lengths of optical paths through which light is transferred to both eyes, thereby preventing distortion of an image transferred to a user.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
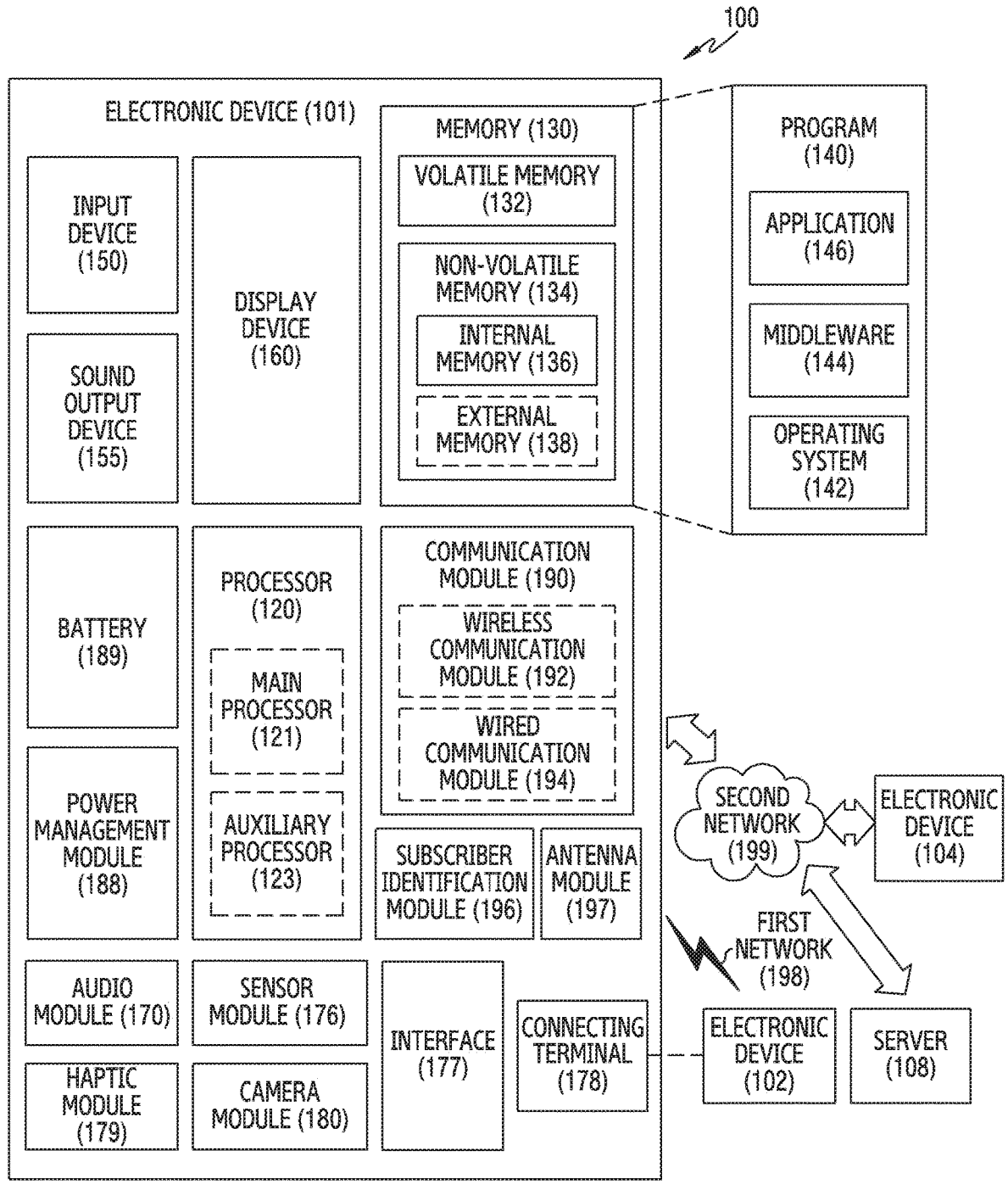
FIG. 1 is a block diagram of an electronic device in a network environment, including optical members for changing an optical path, according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module or interface 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., external electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., external electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., external electronic device 102, external electronic device 104, or server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment, all or some of operations to be executed at the electronic device 101 may be executed at one or more of the external electronic devices 102, 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
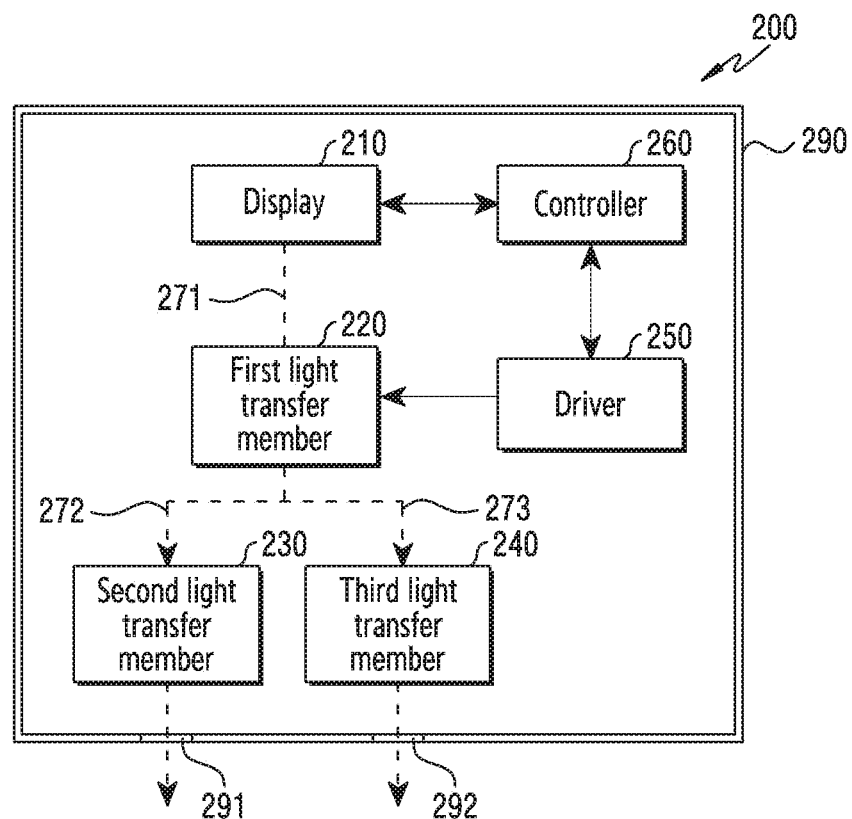
FIG. 2 is a block diagram of an electronic device according to an embodiment of the disclosure.

FIG. 2 is a block diagram of an electronic device according to an embodiment of the disclosure.

Referring to FIG. 2, an electronic device 200 may include a display 210, a first light transfer member 220, a second light transfer member 230, a third light transfer member 240, and a driver 250.

According to an embodiment, the display 210 may emit light to transfer information to a user. The display 210 may be a reflective display or a transmissive display. The reflective display may include a polarizing plate between a reflective Liquid Crystal on Silicon (LCoS) display panel and a light source. The display 210 constructed as the reflective display may have the light source and the LCoS display panel with the first light transfer member 220 interposed therebetween, and the first light transfer member 220 may transfer to the LCoS display panel at least part of light transferred from the light source. According to various embodiments, the transmissive display may have the light source and polarizing plate included in the display device. The transmissive display may be a Liquid Crystal Display (LCD). The light emitted from the display 210 may travel along a first optical path 271.

According to an embodiment, the first light transfer member 220 may transfer the light, which has travelled along the first optical path 271 in the display 210, along a second optical path 272 or a third optical path 273. The first light transfer member 220 may be a polarizing plate, a mirror, or a semi-reflective mirror. The first light transfer member 220 may be a thin glass plate coated with a polarizing film, a reflective film, or a semi-reflective film. When transmission and reflection functions are required, the first light transfer member 220 may be a polarizing plate, a semi-reflective mirror, or a glass plate coated with a polarizing film or a semi-reflective film.

According to various embodiments, when only the reflection function is required, the first light transfer member 220 may be a mirror or a glass plate coated with a reflective film.

According to an embodiment, the second light transfer member 230 and the third light transfer member 240 may reflect light, which is transferred along the second optical path 272 and the third optical path 273, and transfer the light to the outside of a housing 290. The light transferred to the outside of the housing 290 reaches both eyes of the user, and thus the user may acquire information of an image or video output from the display 210. The second light transfer member 230 and the third light transfer member 240 may be reflective members. The second light transfer member 230 and the third light transfer member 240 may include an additional optical element for guiding light on the optical path to the reflective member. The second light transfer member 230 and the third light transfer member 240 may include an optical fiber, such as a light guide or a wave guide. A reflective surface and a reflective grating may be included inside the light guide to transfer light to the outside of the housing 290.

According to various embodiments, the housing 290 may include a first opening 291 and a second opening 292 to transfer light to the outside through the second light transfer member 230 and the third light transfer member 240. The light transferred from the second light transfer member 230 may be emitted to the outside of the housing 290 through the first opening 291, and the light transferred from the third light transfer member 240 may be emitted to the outside of the housing 290 through the second opening 292.

According to an embodiment, the driver 250 may move the first light transfer member 220 so that light incident along the first optical path 271 to the first light transfer member 220 is emitted to the second optical path 272 or the third optical path 273. The first light transfer member 220 may move to a designated position by means of the driver 250 to transfer the light to the second optical path 272. The first light transfer member 220 may move to a designated position by means of the driver 250 to transfer the light to the third optical path 273.

According to an embodiment, a controller 260 (e.g., the processor 120 of FIG. 1) may control turn-on/off of the display 210, and may control an operation, such as a driving speed, driving time, or the like of the driver 250.

According to various embodiments, the controller 260 may turn off the display 210 while the driver 250 operates, and may set the display 210 to be turned on while the driver 250 interrupts the operation. The first light transfer member 220 may move while the driver 250 operates. The light transferred through the first optical path 271 while the first light transfer member 220 moves may be emitted to an unnecessary optical path due to the first light transfer member 220 which is moving, and the light emitted to the unnecessary optical path may be reflected or scattered due to components located inside the electronic device, thereby distorting an image or video transferred to the user. In order to prevent the distortion of the image or to maintain image quality, the controller 260 may set the display 210 to be turned off while the first light transfer member 220 moves.

Figure 3:
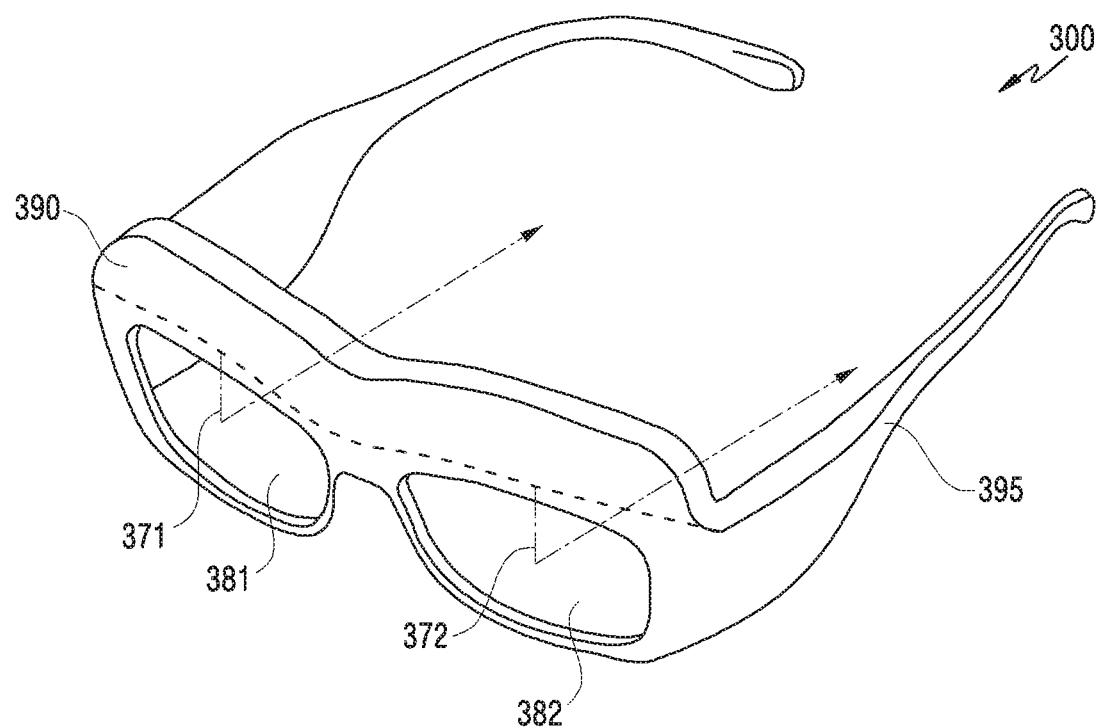
FIG. 3 is a perspective view of an electronic device according to an embodiment of the disclosure.

FIG. 3 is a perspective view of an electronic device according to an embodiment of the disclosure.

Referring to FIG. 3, an electronic device 300 of FIG. 3 may be an electronic device similar or identical to the electronic device 200 of FIG. 2.

Referring to FIG. 3, the electronic device 300 may be an electronic device in the form of eyeglasses, and the electronic device 300 may include an eyeglass frame 395, lenses 381 and 382, and a housing 390.

According to an embodiment, the eyeglass frame 395 may be an eyeglass frame having a typical shape, and may have openings at positions corresponding to eyes of a user. The lenses 381 and 382 may be inserted to the openings.

According to an embodiment, the housing 390 may include a display (e.g., the display 210 of FIG. 2) and an optical device (e.g., the first light transfer member 220, second light transfer member 230, and third light transfer member 240 of FIG. 2). The light emitted from the display may be transferred to the lenses 381 and 382 by means of an opening (not shown) constructed on the outside of the housing 390. The light transferred from the display to the outside of the housing 390 may be transferred to the user by being reflected by the lenses 381 and 382.

According to an embodiment, Augmented Reality (AR) may be implemented in the electronic device 300. A 3D virtual image superposed on a real image recognized through the lenses 381 and 382 may be recognized through optical paths 371 and 372 which transfer light to the outside. The lenses 381 and 382 may include a semi-reflective optical member (e.g., a beam splitter or a half mirror) which transmits part of light and reflects part of the light in order to transmit the real image and reflect part of the light.

Although the electronic device 300 of FIG. 3 is an electronic device which implements the AR, the electronic device 300 may be constructed of a Head Mounted Device (HMD). A front side of both eyes of the user may be sealed so that the real world is not visible to a user's range of vision, and the lenses 381 and 382 may include an optical member (e.g., a mirror or a reflective film) in which only reflection occurs.

Figure 4:
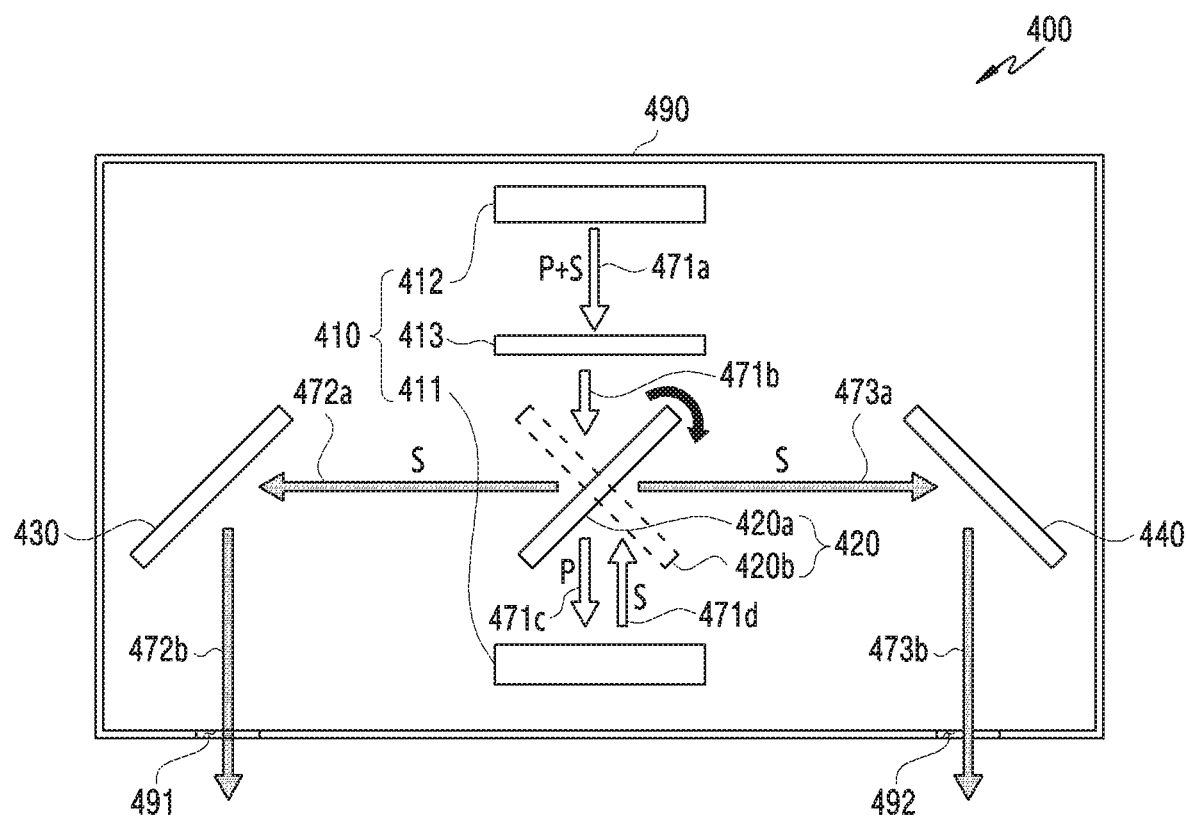
FIG. 4 is a schematic view of an electronic device according to an embodiment of the disclosure.

FIG. 4 is a schematic view of an electronic device according to an embodiment of the disclosure.

Referring to FIG. 4, an electronic device 400 of FIG. 4 may be similar or identical to the electronic device of FIG. 2 and FIG. 3.

The electronic device 400 may include a display 410, a first light transfer member 420, a second light transfer member 430, and a third light transfer member 440.

According to an embodiment, the display 410 is a reflective display device. The display 410 may include a light source 412, a polarizing element 413, and an LCoS display 411. The light source 412 emits light. The light incident to the LCoS display 411 is polarized so that only P-polarized light or S-polarized light can be incident. Light 471a emitted from the light source 412 may include a pair of P- and S-waves orthogonal to each other. In order to produce the polarized light incident to the LCoS display 411, the polarizing element 413 may be constructed to transmit only the P-wave, and light 471b passing through the polarizing element 413 may include only P-polarized light. The light 471b passing through the polarizing element 413 may reach the first light transfer member 420.

According to an embodiment, the first light transfer member 420 may be a polarizing plate which transmits the P-wave and reflects the S-wave orthogonal to the P-wave. The first light transfer member 420 may be an optical element having the substantially same property as the polarizing element 413. The light 471b which has reached the first light transfer member 420 includes only a P-polarization component and thus can pass through the first light transfer member 420. Light 471c passing through the first light transfer member 420 may be transferred to the LCoS display 411.

According to various embodiments, the light 471c passing through the first light transfer member 420 and to be transferred to the LCoS display 411 may be reflected. Light 471d reflected from the LCoS display 411 may be converted from the P-polarized light to the S-polarized light.

According to various embodiments, the light 471d reflected from the LCoS display 411 may reach first light transfer members 420a and 420b. The light 471d reflected from the LCoS display 411 has an S-polarization component, and thus may be reflected from the first light transfer members 420a and 420b.

According to various embodiments, the first light transfer member 420a may transfer light 473a toward the third light transfer member 440 at a first position, and the first light transfer member 420b may transfer the light 472a towards the second light transfer member 430 at a second position. The first light transfer member 420 may rotate by means of a driver (e.g., the driver 250 of FIG. 2), and may move to the first position or the second position. The driver 250 may be configured by a controller (e.g., the controller 260 of FIG. 2) so that an image of 60 Hz can be transferred to both eyes.

According to an embodiment, the second light transfer member 430 and the third light transfer member 440 may be constructed of an optical element, such as a reflective plate or a reflective mirror, capable of changing an optical path by reflecting transferred light. The light 472a and 472b reflected from the first light transfer member 420 may be reflected by the second light transfer member 430 and the third light transfer member 440, respectively.

According to an embodiment, the light 472b reflected by the second light transfer member 430 may be transferred to the outside through a first opening 491 of a housing 490, and light 473b reflected by the third light transfer member 440 may be transferred to the outside through a second opening 492 of the housing 490.

According to various embodiments, the light 472b and 473b transferred to the outside through the first opening 491 and second opening 492 of the housing 490 may be transferred respectively to both eyes of the user by being transmitted or reflected by a lens disposed to the outside.

According to an embodiment, optical paths of the light transferred to the both eyes by being emitted from the light source 412 of the electronic device 400 have the same length, and the electronic device 400 provides an image or video provided from one display. Therefore, display quality may be improved without requiring additional display calibration.

Figure 5:
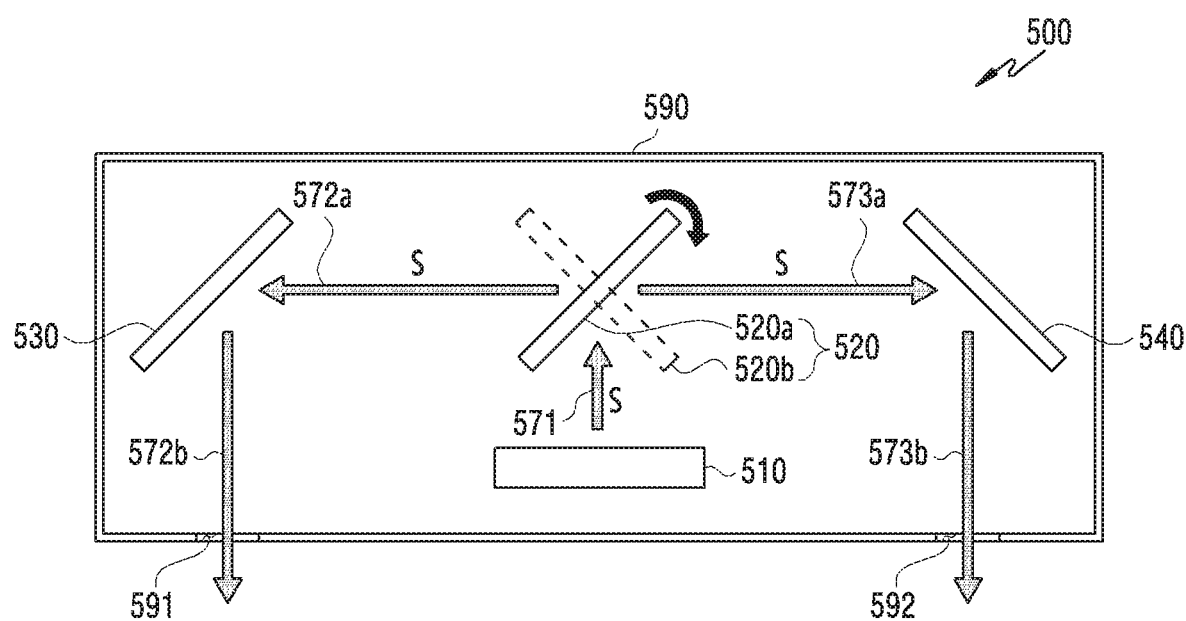
FIG. 5 is a schematic diagram of an electronic device according to an embodiment of the disclosure.

FIG. 5 is a schematic diagram of an electronic device according to an embodiment of the disclosure.

Referring to FIG. 5, an electronic device 500 is an embodiment in which a display 510 is modified in the electronic device of FIG. 4.

The electronic device 500 may include a first light transfer member 520, a second light transfer member 530, and a third light transfer member 540.

According to various embodiments, the display 510 may be a transmissive display device unlike the display 410 of FIG. 4. Since a light source and a polarizing element are already disposed inside the display 510, the display 510 may transfer to-be-emitted polarized light to both eyes of a user. The display 510 may be a transmissive Liquid Crystal Display (LCD). Since the display 510 includes the light source and the polarizing plate, the display 510 may be disposed only to one side with respect to the first light transfer member 520.

According to various embodiments, light 571 emitted from the display 510 may reach the first light transfer member 520. The first light transfer member 520 may be a polarizing plate which transmits P-polarized light and reflects S-polarized light. The light 571 emitted from the display 510 has an S-polarization component and thus may be reflected from the first light transfer member 520.

According to an embodiment, unlike the first light transfer member 420 of FIG. 4, the first light transfer member 520 does not need to transmit the light 571 transferred from the display 510, and thus may be constructed of a mirror or a reflective plate.

According to various embodiments, the first light transfer member 520a may transfer light 573a toward the third light transfer member 540 at a first position, and the first light transfer member 520b may transfer light 572a towards the second light transfer member 530 at a second position. The first light transfer member 520 may rotate by means of a driver (e.g., the driver 250 of FIG. 2), and the first light transfer member 520 may move to the first position or the second position. A rotation speed, an interruption time, or the like may be set for the driver under the control of a controller so that an image of 60 Hz can be transferred to both eyes.

According to an embodiment, the second light transfer member 530 and the third light transfer member 540 may be constructed of an optical element, such as a reflective plate or a reflective mirror, capable of changing an optical path by reflecting transferred light. The light 572a and 572b reflected from the first light transfer member 520 may be reflected by the second light transfer member 530 and the third light transfer member 540, respectively.

According to an embodiment, the light 572b reflected by the second light transfer member 530 may be transferred to the outside through a first opening 591 of a housing 590, and light 573b reflected by the third light transfer member 540 may be transferred to the outside through a second opening 592 of the housing 590.

According to various embodiments, the light 572b and 573b transferred to the outside through the first opening 591 and second opening 592 of the housing 590 may be transferred respectively to both eyes of the user by being transmitted or reflected by a lens disposed to the outside. The user may recognize an image or video by using light transferred to the user.

Figure 6:
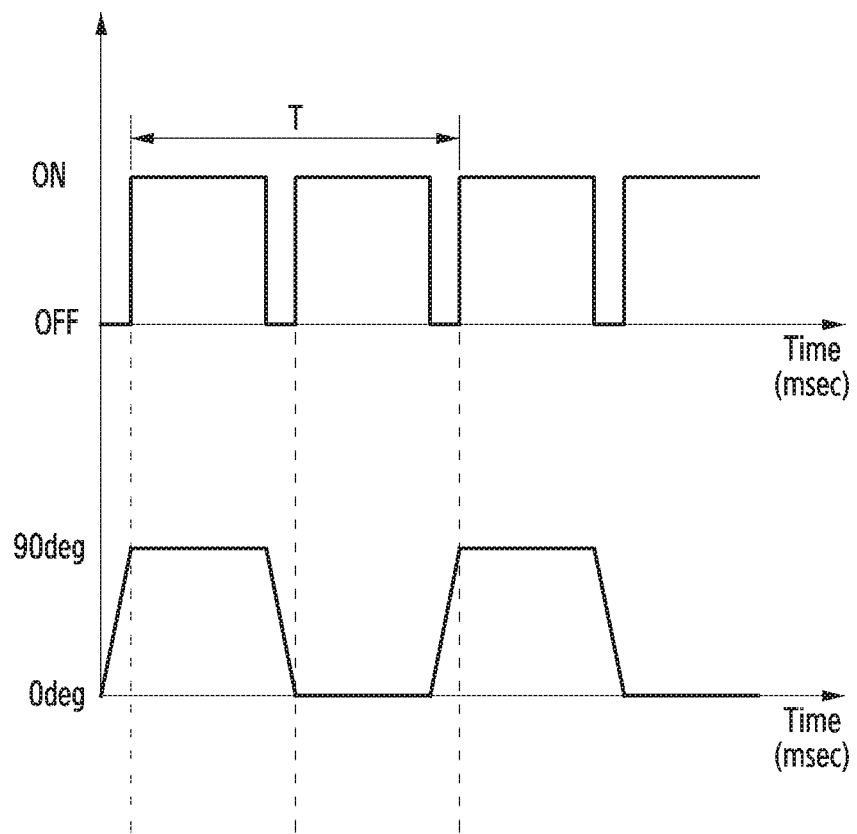
FIG. 6 is a graph illustrating an on/off state of a display and a rotation angle of a driver according to an embodiment of the disclosure.

FIG. 6 is a graph illustrating an on/off state of a display and a rotation angle of a driver according to an embodiment of the disclosure.

Referring to FIG. 6, a graph at an upper side illustrates whether a display is on/off, and a graph at a lower side illustrates a rotation angle of a driver.

According to an embodiment, in the graph illustrating whether the display is on/off, turn-on/off may occur two times in one period T. The graph illustrating the rotation angle of the driver may assume that a first light transfer member (e.g., the first light transfer member 420a located at the first position of FIG. 4) is aligned to a first position immediately before being driven. In the first light transfer member 420a located at the first position, the rotation angle of the driver may be 0 degrees with respect to a reference angle. In the second light transfer member (e.g., the first light transfer member 420b located at the second position of FIG. 4) located at a second position, the rotation angle of the driver may be 90 degrees with respect to the reference angle.

Referring to the graph illustrating the rotation angle of the driver, the driver may interrupt the operation for a designated time after rotating by a designated angle. After the designated time elapses, the driver may rotate by the designated angle in a direction opposite to an initial rotation direction, and the driver may interrupt the operation for the designated time.

Referring to the graph illustrating the on/off state of the display, the display may be turned off for a time where the driver rotates, and the display may be turned on while the driver is interrupted.

According to an embodiment, after the driver aligns the first light transfer member 420a to the first position, the driver may rotate 90 degrees so that the first light transfer member 420b is located at the second position. The display may be maintained to be an off state while the driver rotates.

When a designated time elapses after the first light transfer member 420b is located at the second position, the driver may rotate −90 degrees so that the first light transfer member 420a moves to the first position. Assuming that this process takes one period T, the driver and the display may be controlled repeatedly according to the aforementioned process.

According to an embodiment, for one period T, the first light transfer member 420a may be located at the first position, and first light transfer member 420b may be located at the second position. In order to transfer an image of 60 Hz to the both eyes of the user by the first light transfer member 420, a reciprocating period T of the first light transfer member 420 may be 1/60 seconds and a reciprocating frequency may be 60 Hz. When an image of at least 60 Hz is transferred to the both eyes of the user, since the user may not visually recognize instantaneous turn-on/off of the display and may recognize a series of images or video, the driver may be driven at 60 Hz or higher. In this case, a period of the driver may be 1/60 seconds or less.

Figure 7:
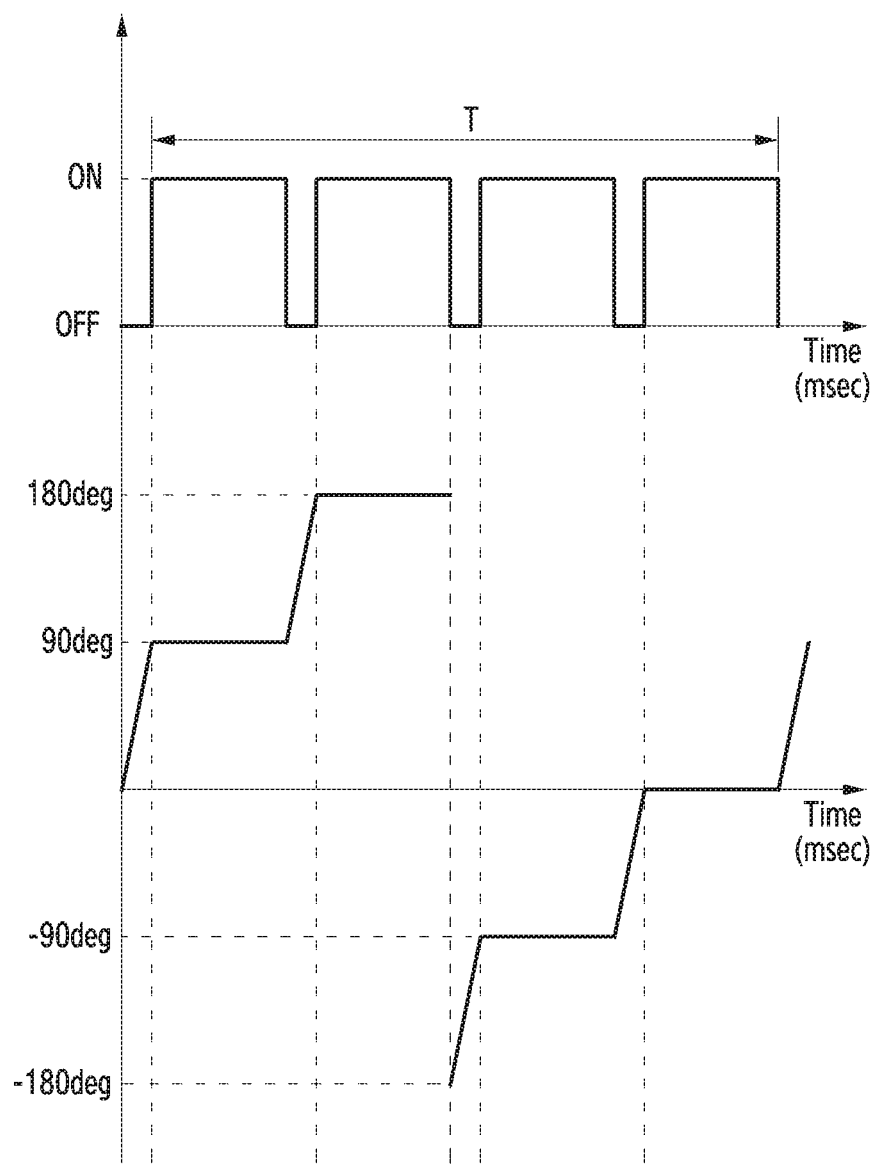
FIG. 7 is a graph illustrating an on/off state of a display and a rotation angle of a driver according to an embodiment of the disclosure.

FIG. 7 is a graph illustrating an on/off state of a display and a rotation angle of a driver according to an embodiment of the disclosure.

Referring to FIG. 7, a graph at an upper side illustrates whether a display is on/off, and a graph at a lower side illustrates a rotation angle of a driver.

According to an embodiment, in the graph illustrating whether the display is on/off, turn-on/off may occur four times in one period T. The graph illustrating the rotation angle of the driver may assume that a first light transfer member (e.g., the first light transfer member 420a located at the first position of FIG. 4) is aligned to a first position immediately before being driven. In a first portion of period T, the light transfer member may be located at the first position and the rotation angle of the driver may be 0 degrees with respect to a reference angle. In a second portion of period T, the light transfer member (e.g., the first light transfer member 420b located at the second position of FIG. 4) may be located at a second position and the rotation angle of the driver may be 90 degrees with respect to the reference angle.

Unlike the driver of FIG. 6, the driver may rotate continuously as shown in FIG. 7. For example, in the driver, the first light transfer member 420a located at the first position may have a driver of which a rotation angle is 0 degrees and 180 degrees (or −180 degrees) with respect to a reference angle, and the first light transfer member 420b located at the second position may have a driver of which a rogation angle is 90 degrees and −90 degrees with respect to the reference angle.

Referring to the graph illustrating the rotation angle of the driver, after rotating by a designated angle, the driver may interrupt an operation for a designated time. After the designated time elapses, the driver may rotate by the designated angle in an initial rotation direction, and the driver may interrupt the operation for the designated time. The driver may rotate 360 degrees by repeating the aforementioned process.

Referring to the graph illustrating the on/off state of the display, the display may be turned off for a time where the driver rotates, and the display may be turned on while the driver is interrupted.

According to an embodiment, after the driver aligns the first light transfer member 420a to the first position, the driver may rotate 90 degrees so that the first light transfer member 420b is located at the second position. When a designated time elapses after the first light transfer member 420b is located at the second position, the rotation angle of the driver may be 180 degrees with respect to the reference angle through an additional rotation of 90 degrees of the driver. The driver rotates 180 degrees, so that only a position of an outer face of the first light transfer member 420a initially aligned is changed, and the first light transfer member 420 may be located at the first position. The display may be maintained to be an off state while the driver rotates.

The driver may continue to rotate in the same direction to rotate 360 degrees. Assuming that this process takes one period T, the driver and the display may be controlled repeatedly according to the aforementioned process.

According to an embodiment, for one period T, the first light transfer member 420a may be located two times at the first position, and first light transfer member 420b may be located two times at the second position. In order to transfer an image of 60 Hz to the both eyes of the user by the first light transfer member 420, a reciprocating period T of the first light transfer member 420 may be 1/30 seconds and a reciprocating frequency may be 30 Hz. When an image of at least 60 Hz is transferred to the both eyes of the user, since the user may not visually recognize instantaneous turn-on/off of the display and may recognize a series of images or video, the driver may be driven at 30 Hz or higher. In this case, a period of the driver may be 1/30 seconds or less.

Figure 8:
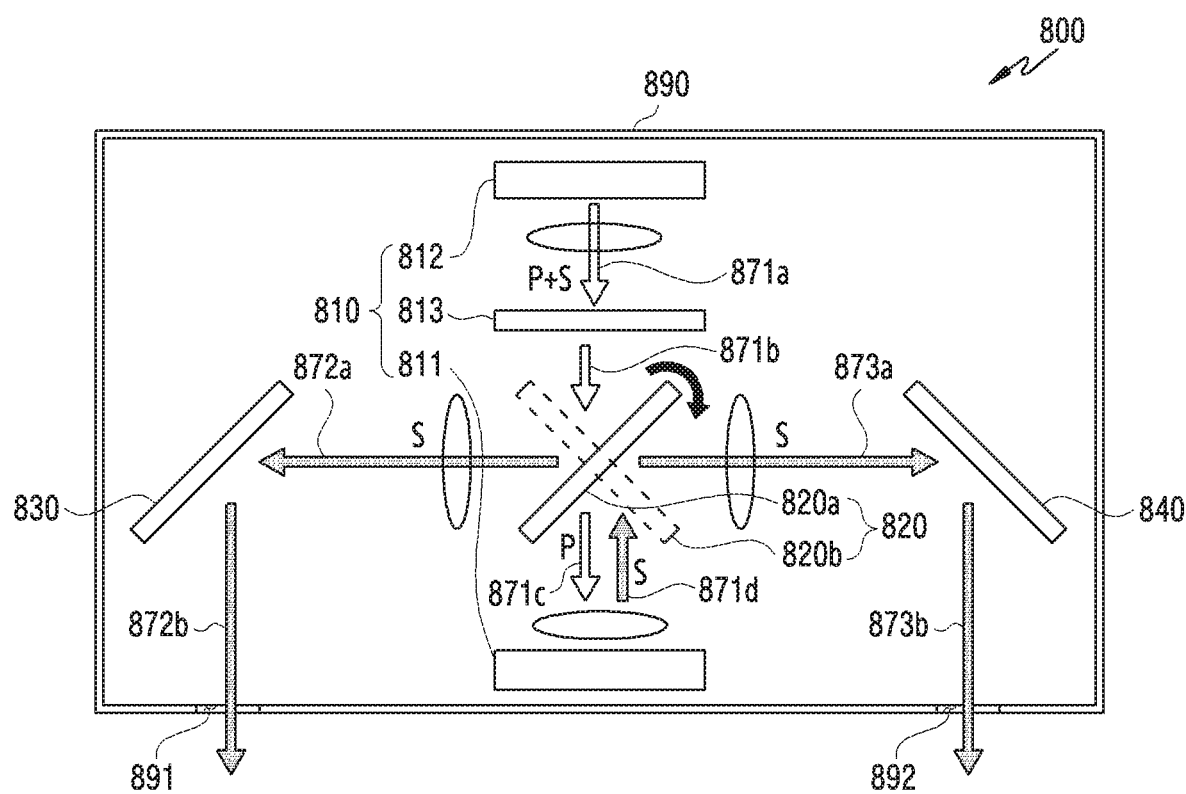
FIG. 8 is a schematic view of an electronic device having a lens added on an optical path according to an embodiment of the disclosure.

FIG. 8 is a schematic view of an electronic device having a lens added on an optical path according to an embodiment of the disclosure.

Referring to FIG. 8, an electronic device 800 may include a display 810, a first light transfer member 820, a second light transfer member 830, and a third light transfer member 840. The electronic device 800 of FIG. 8 may have a lens unit added on optical paths 871a, 871c, 872a, and 873a in the electronic device 400 of FIG. 4.

According to various embodiments, the lens unit may be located on the optical path on which light is transferred to both eyes of a user from a light source 812.

According to an embodiment, the lens unit may utilize a collimated lens or a lens assembly so that light emitted from the light source 812 becomes as parallel light, and allow a beam of light emitted from the LCoS panel 811 to be uniform.

According to an embodiment, the lens unit disposed between the first light transfer member 820a and the third light transfer member 840 and between the first light transfer member 820a and the second light transfer member 830 may prevent distortion of an image or video incident to the both eyes of the user, and may increase optical properties.

According to an embodiment, the display 810 may be a reflective display device, such as the display 410 of FIG. 4. The display 810 may include the light source 812, a polarizing element 813, and an LCoS display 811. The light source 812 emits light including P-polarized light and S-polarized light. The light incident to the LCoS display 811 is polarized so that only the P-polarized light or the S-polarized light can be incident. In order to produce the polarized light incident to the LCoS display 811, the polarizing element 813 may be constructed to transmit only a P-wave, and light 871b passing through the polarizing element 813 may include only P-polarized light. The light 871b passing through the polarizing element 813 may reach the first light transfer member 820. The lens unit may be disposed between the polarizing element 813 and the light source 812, and light emitted from the light source is parallel light so that the light travels in a parallel direction.

According to an embodiment, the first light transfer member 820 may be a polarizing plate which transmits the P-wave and reflects an S-wave orthogonal to the P-wave. The first light transfer member 820 may be an optical element having the same property as the polarizing element 813. The light 871b which has reached the first light transfer member 820 includes only a P-polarization component and thus can pass through the first light transfer member 820. The light 871c passing through the first light transfer member 820 may be transferred to the LCoS display 811, and the transferred light may be reflected from the LCoS display 811. Light 871d reflected from the LCoS display 811 may be converted from the P-polarized light to the S-polarized light.

According to various embodiments, the light reflected from the LCoS display 811 may reach the first light transfer member 820 by passing through the lens unit. The lens unit may allow light emitted from the LCoS display 811 to be uniform. The light 871d reflected from the LCoS display 811 has an S-polarization component, and thus may be reflected from the first light transfer member 820.

According to various embodiments, the first light transfer member 820a may transfer the light 873a toward the third light transfer member 840 at a first position, and the first light transfer member 820b may transfer the light 872a towards the second light transfer member 830 at a second position. The lens unit may be disposed between the first light transfer member 820a and the third light transfer member 840 and between the first light transfer member 820a and the second light transfer member 830. The lens unit may transmit light 872a and 872b so that the light travels in parallel, and may maintain a length of an optical path. The lens unit may prevent distortion of an image or video incident to the both eyes of the user, and may increase optical properties.

According to an embodiment, the second light transfer member 830 and the third light transfer member 840 may be constructed of an optical element capable of changing an optical path by reflecting the transferred light. The light 872a and 872b reflected from the first light transfer member 820 may be reflected by the second light transfer member 830 and the third light transfer member 840. According to an embodiment, the light 872b reflected by the second light transfer member 830 may be transferred to the outside through a first opening 891 of a housing 890, and light 873b reflected by the third light transfer member 840 may be transferred to the outside through a second opening 892 of the housing 890.

Figure 9A:
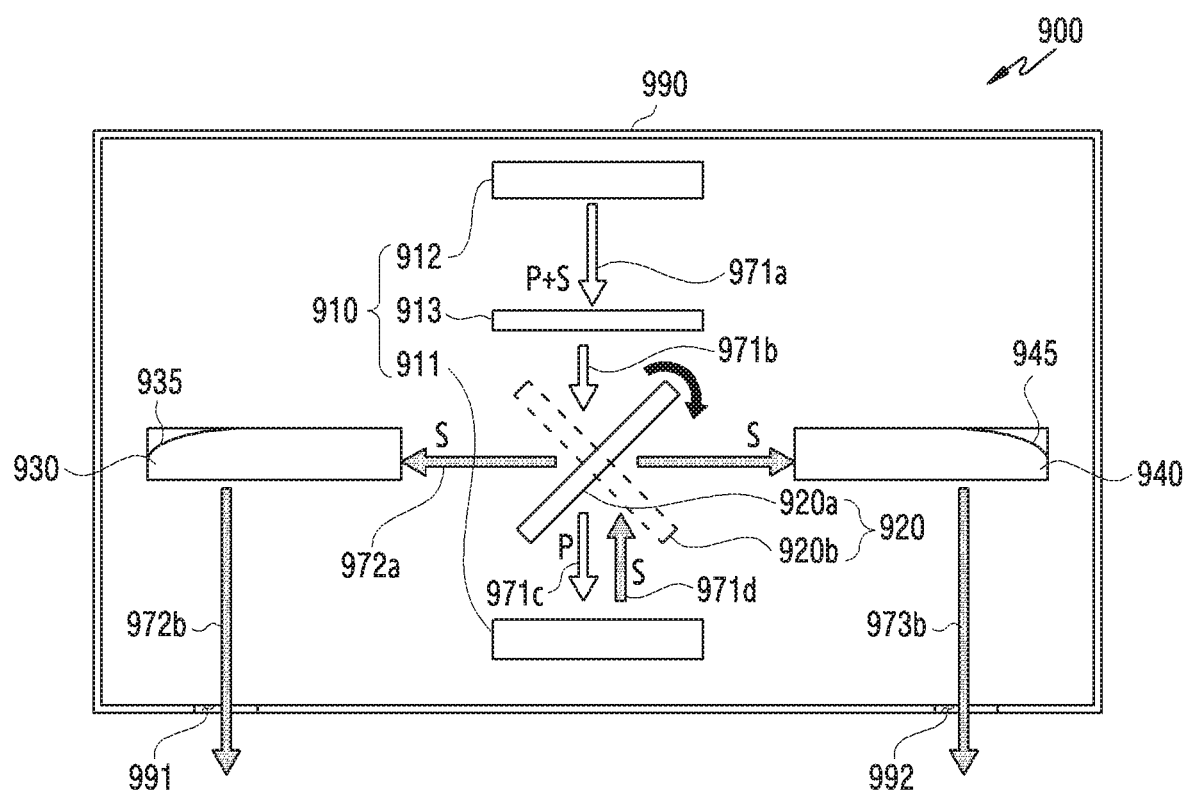
FIG. 9A is a schematic view of a light transfer member partially modified from an electronic device of FIG. 4 according to an embodiment of the disclosure.

FIG. 9A is a schematic view of a light transfer member partially modified from an electronic device of FIG. 4 according to an embodiment of the disclosure.

Figure 9B:
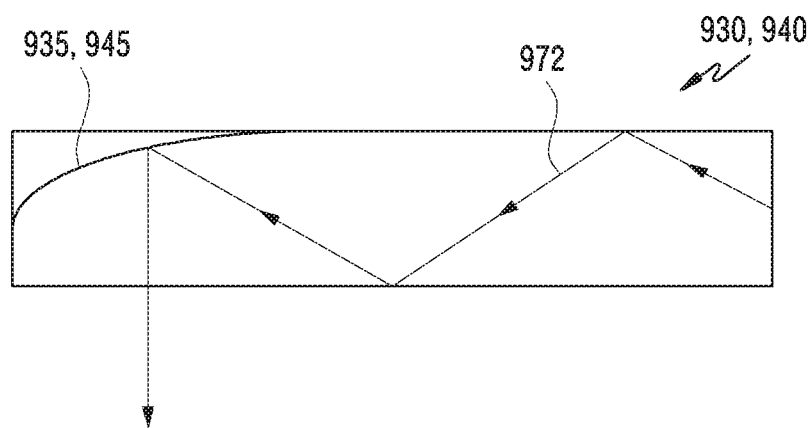
FIG. 9B illustrates a light transfer member of an electronic device according to an embodiment of the disclosure.

FIG. 9B illustrates a light transfer member of an electronic device according to an embodiment of the disclosure.

Referring to FIG. 9A, an electronic device 900 may include a display 910, a first light transfer member 920, a second light transfer member 930, and a third light transfer member 940. According to an embodiment, the display 910 may be a reflective display device, such as the display 410 of FIG. 4, and the display 910 may include a light source 912, a polarizing element 913, and an LCoS display 911. Light 971a emitted from the light source 912 includes P-polarized light and S-polarized light. However, regarding the light 971b passing through the polarizing element 913, only the P-polarized light is transmitted and then is reflected from the LCOS display 911, thereby changing to the S-polarized light.

According to an embodiment, the first light transfer member 920 may transmit the P-polarized light 971c and reflect the S-polarized light 971d based on a position of the first light transfer member 920 (e.g., 920a, 920b). Light 971d reflected from the LCoS display 911 may be transferred to the first light transfer member 920.

According to various embodiments, the first light transfer member 920 may reflect light at a first position and a second position, and may transfer the light to the second light transfer member 930 or the third light transfer member 940. The second light transfer member 930 may reflect light 972a incident to the second light transfer member 930, and light 972b reflected from the second light transfer member 930 may be transferred to eyes of the user through a first opening 991 of a housing 990. The third light transfer member 940 may reflect light 973a incident to the third light transfer member 940, and light 973b reflected from the third light transfer member 940 may be transferred to the eyes of the user through a second opening 992 of the housing 990.

Referring to FIG. 9B, the second light transfer member 930 and the third light transfer member 940 may construct reflection planes 935 and 945 at the other end of a portion to which light is incident. The second light transfer member 930 and the third light transfer member 940 may be an optical guide member which is one of optical fibers, and may include the reflection planes 935 and 945 constructed as an inclined plane or curved plane in order to modify a travelling direction of light.

Light 972 obliquely incident to the second light transfer member 930 and the third light transfer member 940 may travel by being reflected from an inner wall of the optical fiber, and then may be reflected from the reflection planes 935 and 945 so as to be emitted to the outside through the first opening 991 and second opening 992 of the housing 990.

Figure 10A:
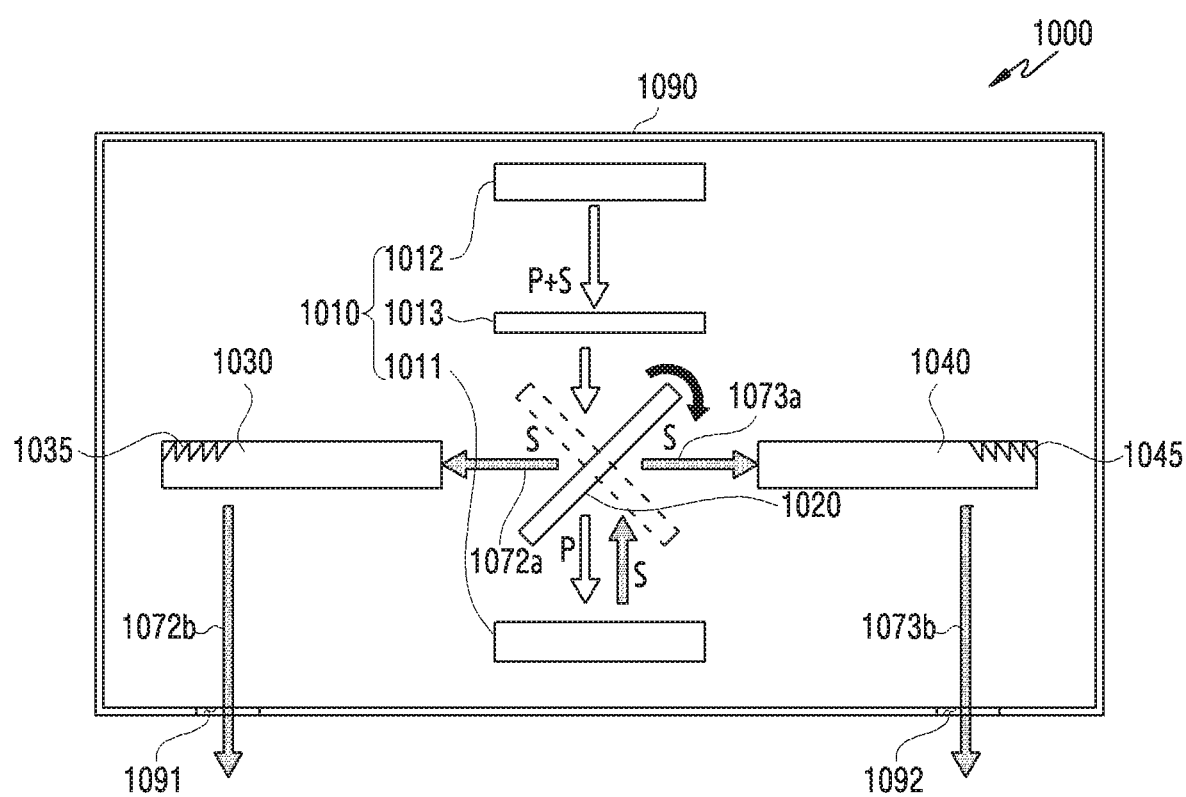
FIG. 10A illustrates a modification of an electronic device of FIG. 9A according to an embodiment of the disclosure.

FIG. 10A illustrates a modification of the electronic device of FIG. 9A according to an embodiment of the disclosure.

Figure 10B:
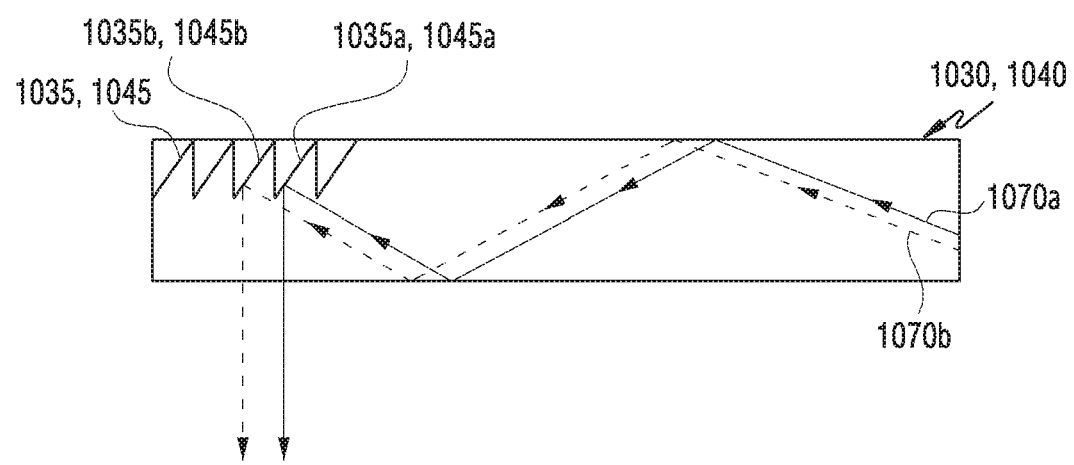
FIG. 10B illustrates a light transfer member of an electronic device according to an embodiment of the disclosure.

FIG. 10B illustrates a light transfer member of an electronic device according to an embodiment of the disclosure.

Referring to FIG. 10A, an electronic device 1000 may include a display 1010, a first light transfer member 1020, a second light transfer member 1030, and a third light transfer member 1040. The electronic device 1000 of FIG. 10A may include the second light transfer member 1030 and third light transfer member 1040 modified from the electronic device of FIG. 9A.

According to an embodiment, the display 1010 may be a reflective display device, such as the display 410 of FIG. 4, and the display 1010 may include a light source 1012, a polarizing element 1013, and an LCoS display 1011. Light emitted from the light source 1012 includes P-polarized light and S-polarized light. However, regarding the light passing through the polarizing element 1013, only the P-polarized light is transmitted and then is reflected from the LCoS display 1011, thereby changing to the S-polarized light.

According to an embodiment, the first light transfer member 1020 may transmit the P-polarized light and reflect the S-polarized light. The light reflected from the LCoS display 1011 includes only an S polarization component, and thus may be reflected.

According to various embodiments, the first light transfer member 1020 may reflect light at a first position and a second position, and may transfer the light to the second light transfer member 1030 or the third light transfer member 1040. The second light transfer member 1030 may reflect light 1072*a* incident to the second light transfer member 1030, and light 1072*b* reflected from the second light transfer member 1030 may be transferred to eyes of the user through a first opening 1091 of a housing 1090. The third light transfer member 1040 may reflect light 1073*a* incident to the third light transfer member 1040, and light 1073*b* reflected from the third light transfer member 1040 may be transferred to the eyes of the user through a second opening 1092 of the housing 1090.

Referring to FIG. 10B, the second light transfer member 1030 and the third light transfer member 1040 may construct gratings 1035 and 1045 at the other end of a portion to which light is incident. The second light transfer member 1030 and the third light transfer member 1040 may be an optical guide member which is one of optical fibers, and may include the serrated gratings 1035 and 1045 having an inclination in order to modify a travelling direction of light.

First light 1070*a* and second light 1070*b* obliquely incident to the second light transfer member 1030 and the third light transfer member 1040 may travel by being reflected from an inner wall of an optical fiber, and the first light 1070*a* and the second light 1070*b* may travel in parallel with each other. The light may be reflected from a surface of the gratings 1035 and 1045, and may be emitted to the outside through the first opening 991 and second opening 992 of the housing 990. The first light 1070*a* may be reflected from first surfaces 1035*a* and 1045*a* of the gratings 1035 and 1045 while travelling inside the second light transfer member 1030 and the third light transfer member 1040, and the second light 1070*b* may be reflected from second surfaces 1035*b* and 1045*b* of the gratings 1035 and 1045 while travelling inside the second light transfer member 1030 and the third light transfer member 1040, thereby changing an optical path.

Figure 11A:
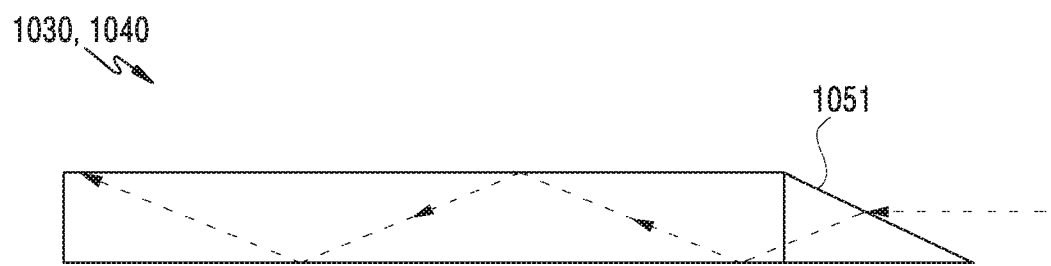
FIG. 11A is a schematic view of a light transfer member of an electronic device according to an embodiment of the disclosure.
Figure 11B:
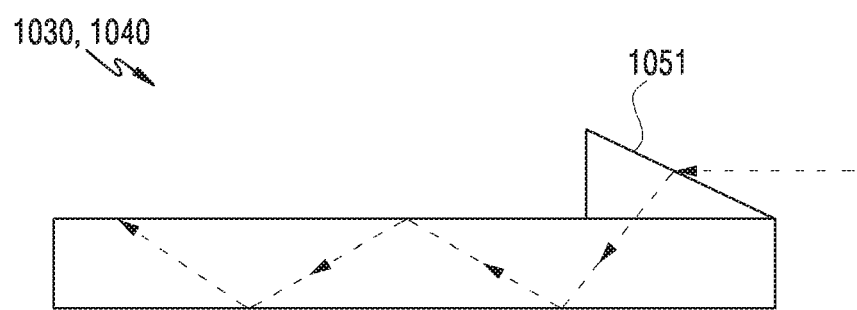
FIG. 11B is a schematic view of a light transfer member of an electronic device according to an embodiment of the disclosure.

FIGS. 11A and 11B are schematic views of a light transfer member of an electronic device according to various embodiments of the disclosure.

Referring to FIGS. 11A and 11B, an additional optical member 1051 may be included or integrally constructed, so that an incident angle of light transferred to the second light transfer member 1030 and the third light transfer member 1040 is not 90 degrees.

According to an embodiment, the optical member 1051 may allow an incidence plane of light to have a specific inclination with respect to a traveling direction of the light, so that the light is transferred to a user without loss of light due to total reflection occurring along an optical fiber.

The optical member 1051 may be attached to one end portion of the second light transfer member 1030 and third light transfer member 1040, and may be attached to an upper, lower, or side face of the end portion. The optical member 1051 may be constructed of the substantially same material as the second light transfer member 1030 and the third light transfer member 1040, and may be integrally constructed.

Figure 12:
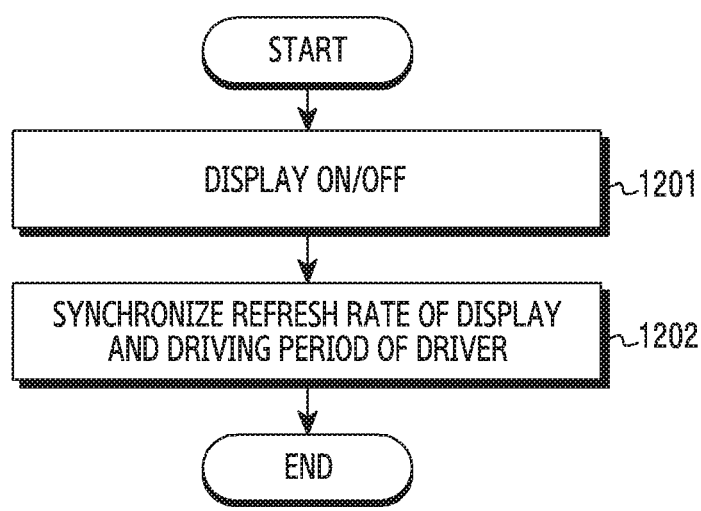
FIG. 12 is a flowchart illustrating an operation of an electronic device according to an embodiment of the disclosure.
Figure 13:
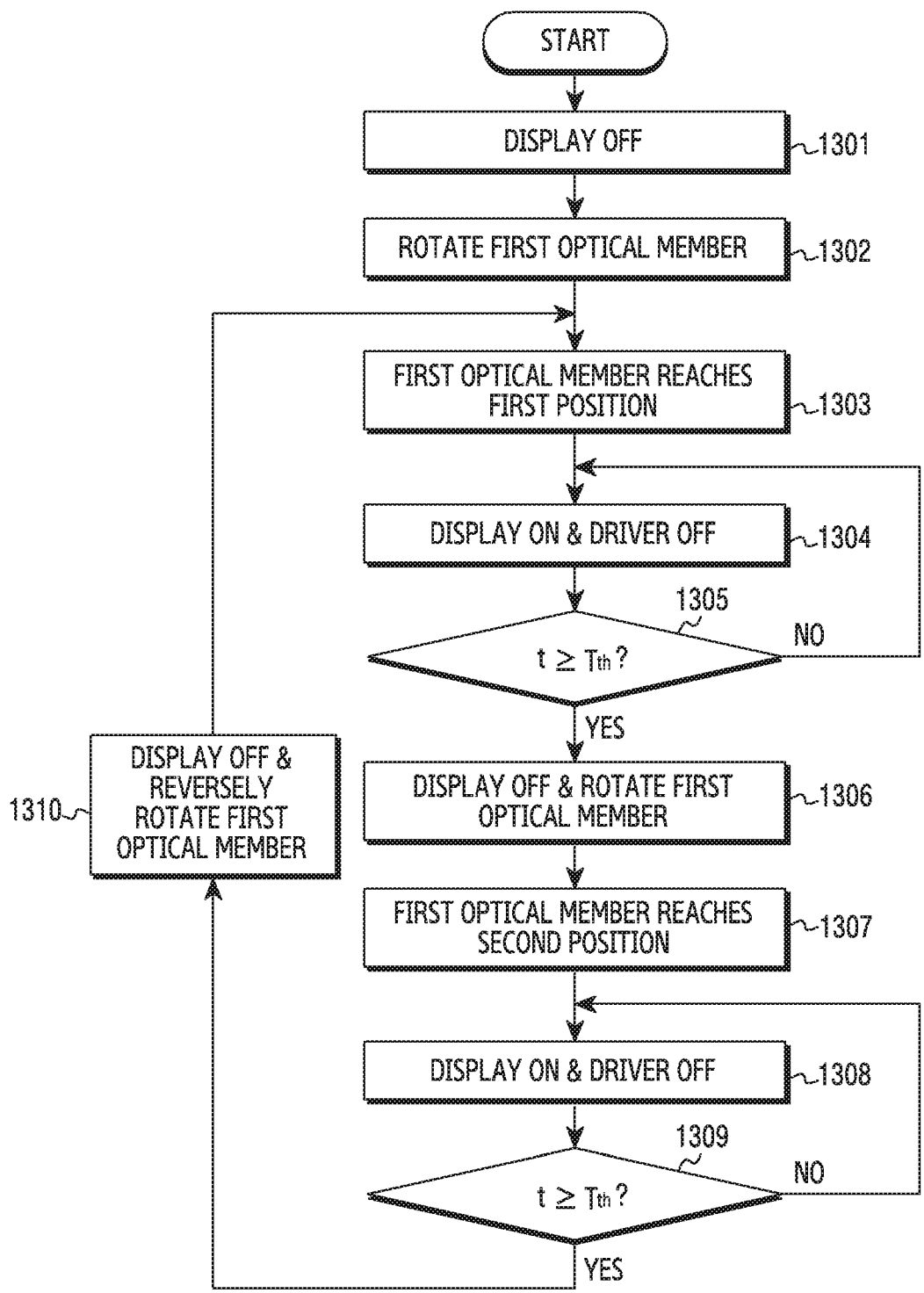
FIG. 13 is a flowchart illustrating an operation of an electronic device according to an embodiment of the disclosure.
Figure 14:
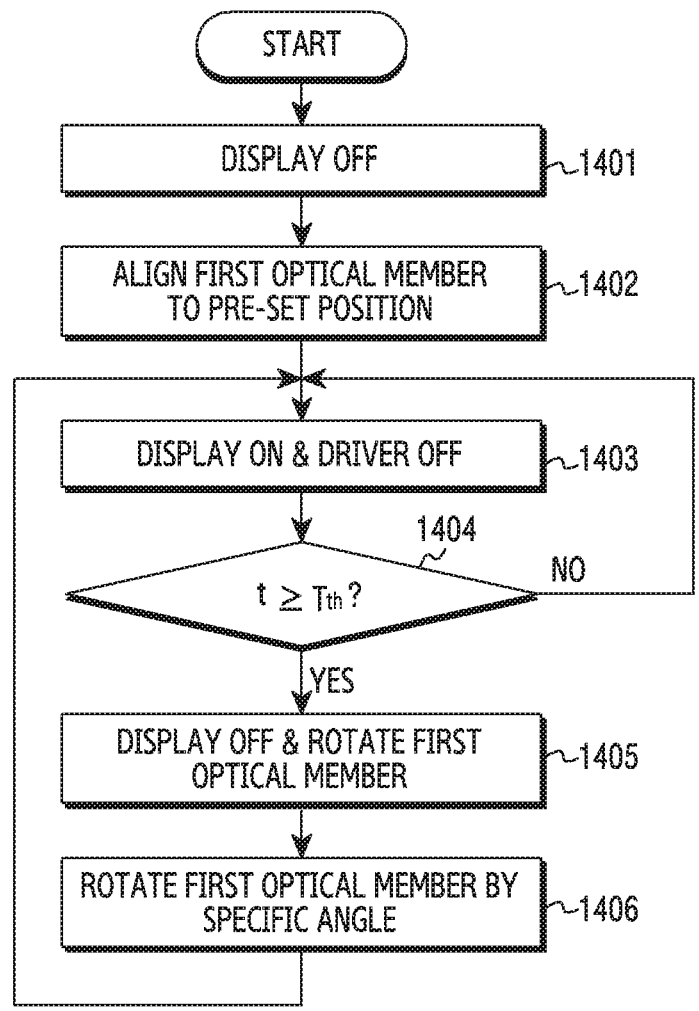
FIG. 14 is a flowchart illustrating an operation of an electronic device according to an embodiment of the disclosure.

FIGS. 12, 13, and 14 are flowcharts illustrating an operation of an electronic device according to various embodiments of the disclosure.

Referring to FIG. 12, in operation 1201, a display may be periodically turned on and off. A refresh rate of the display may be a reciprocal of a turn-on/off period of the display. Since the display has the same image per frame, when an image of one frame is transferred to both eyes, the substantially same image can be transferred.

In operation 1202, a driving period of a driver may be synchronized with the refresh rate of the display. In order for a first optical member, which operates by the driver, to transfer the transferred image to the both eyes as the substantially same image, a driving frequency of the driver may be the same as the refresh rate of the display, and may be synchronized with a multiple of the refresh rate of the display. According to various embodiments, if the driving frequency of the driver is the same as the refresh rate of the display, the substantially same screen may be transferred to the both eyes by means of the first optical member. According to various embodiments, if the driving frequency of the driver is n-fold of the refresh rate of the display, the substantially same screen may be transferred to the both eyes n times by means of the first optical member.

Referring to FIG. 13, a driver (e.g., the driver 250 of FIG. 2) of an electronic device (e.g., the electronic device 400 of FIG. 4) may reciprocate between a first position and a second position in order to synchronize a refresh rate of the display and a driving period of the driver.

In operation 1301, the display may be in an off state. The electronic device (e.g., the electronic device 400 of FIG. 4) is in a state of not being driven yet in operation 1301. When the electronic device 400 operates, in operation 1302, a controller (e.g., the controller 260 of FIG. 2) may start to rotate a first optical member (e.g., the first light transfer member 420 of FIG. 4) by means of a driver (e.g., the driver 250 of FIG. 2). The first light transfer member 420 may rotate and move to a designated position.

In operation 1303, the controller 260 may detect whether the first optical member reaches the first position. If an initial set position is the first position, the driver 250 may rotate until the first light transfer member 420a reaches the first position.

In operation 1304, a display (e.g., the display 410 of FIG. 4) may transition to an on state, and the driver 250 may be interrupted. For example, rotation of the first light transfer member 420 may be interrupted (e.g., the first light transfer member 420 remains stationary) after the first light member 420 reaches the first position. In operation 1305, the display 410 may remain in the on state for a designated time $T_{th}$. If a time 't' for which the display remains in the on state is less than the designated time $T_{th}$, the operation 1304 may be maintained.

In operation 1306, if the time 't' for which the display 410 remains in the on state is greater than the designated time $T_{th}$, the display 410 may transition to the off state, and the first light transfer member 420 may reversely rotate by means of the driver 250. A reverse rotation direction of the driver 250 may be opposite to a direction in which the first light transfer member 420 moves from the first position to the second position. If the display 410 remains in the on state while the first light transfer member 420 reversely rotates, since distortion may occur in an image or video, the display 410 may transition to the off state.

In operation 1307, the controller 260 may detect whether the first optical member reaches the second position. The driver 250 may rotate until the first light transfer member 420a reaches the second position.

In operation 1308, the display 410 may transition to the on state, and may interrupt the driver 250. In operation 1309, the display 410 may remain in the on state for a designated time $T_{th}$. If a time 't' for which the display remains in the on state is less than the designated time $T_{th}$, the operation 1308 may be maintained.

In operation 1310, if the time 't' for which the display 410 remains in the on state is greater than the designated time $T_{th}$, the display 410 may transition to the off state, and the first light transfer member 420 may rotate by means of the driver 250. If the display 410 remains in the on state while the first light transfer member 420 rotates, since distortion may occur in an image or video, the display 410 may transition to the off state. Thereafter, the electronic device 400 may repeat the operations starting from the operation 1303.

Referring to FIG. 14, a driver (e.g., the driver 250 of FIG. 2) of an electronic device (e.g., the electronic device 400 of FIG. 4) may rotate.

In operation 1401, a display may be in the off state. The electronic device (e.g., the electronic device 400 of FIG. 4) is in a state of not being driven yet in operation 1401. When the electronic device 400 operates, in operation 1402, a controller (e.g., the controller 260 of FIG. 2) may start to rotate a first optical member (e.g., the first light transfer member 420 of FIG. 4) by means of a driver (e.g., the driver 250 of FIG. 2). The first light transfer member 420 may rotate so as to be aligned to a designated position.

In operation 1403, upon detecting whether the first optical member reaches the first position, the controller 260 may allow the display (e.g., the display 410 of FIG. 4) to be the on state, and may interrupt the driver 250.

In operation 1405, the display 410 may remain in the on state for a designated time $T_{th}$. If a time 't' for which the display remains in the on state is less than the designated time $T_{th}$, the operation 1404 may be maintained.

In operation 1406, if the time 't' for which the display 410 remains in the on state is greater than the designated time $T_{th}$, the display 410 may transition to the off state, and the first light transfer member 420 may rotate by means of the driver 250. The driver 250 may rotate in the substantially same direction unlike the operation of FIG. 13.

As described above, an electronic device according to various embodiments may be an AR electronic device having one display to transfer an image or video to both eyes. In order to transfer light emitted from one display to the both eyes, the electronic device may include a first light transfer member coupled to the driver. The first light transfer member may reflect the transferred light at a designated position to transfer the light to the both eyes. An optical path on which the light is transferred to the both eyes can be adjusted to be constant by means of the first light transfer member 420, thereby preventing image distortion. The electronic device 400 includes a fewer number of displays 410 and optical members or the like compared with a device having two displays. Therefore, the electronic device 400 can be manufactured to be small in size and light in weight, thereby improving user's wearing feeling.

An electronic device (e.g., the electronic device 200 of FIG. 2) according to an embodiment may include a display (e.g., the display 210 of FIG. 2) including a light source configured to emit light, a first light transfer member (e.g., the first light transfer member 220 of FIG. 2) located on a first optical path (e.g., the first optical path 271 of FIG. 2) of the light, the first light transfer member configured to selectively transfer the light of the first optical path to a second optical path (e.g., the second optical path 272 of FIG. 2) or a third optical path (e.g., the third optical path 273 of FIG. 2), a driver (e.g., the driver 250 of FIG. 2) configured to drive the first light transfer member, a second light transfer member (e.g., the second light transfer member 230 of FIG. 2) disposed on the second optical path and transferring light incident via the second optical path to the outside of the electronic device, and a third light transfer member (e.g., the third light transfer member 240 of FIG. 2) disposed on the third optical path and transferring light incident via the third optical path to the outside of the electronic device. The second optical path and the third optical path may be substantially symmetrical with respect to the first optical path.

According to an embodiment, the first light transfer member may rotate to a first position to transfer along the second optical path the light transferred to the first light transfer member, and wherein the first light transfer member rotate to a second position to transfer along the third optical path the light transferred to the first light transfer member.

According to an embodiment, the first light transfer member may reciprocally rotate between the first position and the second position by means of the driver.

According to an embodiment, the rotation of the first light transfer member may be interrupted for a designated time when the first light transfer member reaches the first position or the second position.

According to an embodiment, a reciprocating frequency for rotating the first light transfer member between the first position and the second position may be associated with a refresh rate of the display. The refresh rate may include a range greater than or equal to 60 Hz.

According to an embodiment, the first light transfer member may rotate to a third position to transfer along the second optical path the light transferred to the first light transfer member and rotate to a fourth position to transfer along the third optical path the light transferred to the first light transfer member. The first light transfer member may rotate by means of the driver.

According to an embodiment, rotation of the first light transfer member may be interrupted for a designated time when the first light transfer member reaches the first position, the second position, the third position, or the fourth position.

According to an embodiment, light transferred to the outside of the electronic device through the second light transfer member and the third light transfer member may be transferred in a direction associated with eyes of a user. The light transferred to the outside of the electronic device may produce a stereoscopic image.

According to an embodiment, the display may operate when the first light transfer member is located at a designated position, and an operation of display is interrupted when the first light transfer member rotates.

According to an embodiment, the display may include a Liquid Crystal on Silicon (LCoS) panel, and the light source of the display may face the LCoS panel with the first light transfer member is disposed between the LCoS panel and the light source of the display.

According to an embodiment, a polarizing plate may be disposed between the light source and the first light transfer member.

According to an embodiment, a distance in which light emitted from the light source travels to the outside of the electronic device via the second optical path may be substantially the same as a distance in which the light emitted from the light source travels to the outside of the electronic device via the third optical path.

According to an embodiment, the first light transfer member may include a polarizing plate.

According to an embodiment, the electronic device may include at least one pair of lenses disposed in the second optical path or the third optical path.

According to an embodiment, the second light transfer member may completely reflect light emitted from the light source and incident on the second light transfer member via the second optical path to the outside of the electronic device, or the third light transfer member may completely reflects light emitted from the light source and incident on the third light transfer member via the third optical path to the outside of the electronic device.

According to an embodiment, the second light transfer member or the third light transfer member may include an optical element configured to guide light received via the first light transfer member to a reflector configured to reflect the light received via the first light transfer member to the outside of the electronic device. The optical element may be disposed on a first end of the second light transfer member or the third light transfer member, and the reflector may be disposed on a second end of the second light transfer member or the third light transfer member.

According to an embodiment, an electronic device may include a display including a light source configured to emit light, a first light transfer member located on a first optical path of the light and transferring the light of the first optical path to a second optical path or a third optical path, a driver configured to selectively rotate the first light transfer member, a second light transfer member disposed on the second optical path changed by the first light transfer member and transferring light incident via the second optical path to the outside of the electronic device, a third light transfer member disposed on the third optical path changed by the second light transfer member and transferring light incident via the third optical path to the outside of the electronic device, and at least one processor electrically coupled with the driver and the display. the at least one processor may be configured to control an operation of the driver and the display.

According to an embodiment, the at least one processor may be configured to control the driver to rotate the first light transfer member to a first position such that light transferred to the first light transfer member is transferred along the second optical path, and control the driver to rotate the first light transfer member to a second position such that light transferred to the first light transfer member is transferred along the third optical path.

According to an embodiment, the at least one processor may be configured to control the display to turn on for a designated period of time when the first light transfer member is rotated to the first position, and in response to the designated period of time elapsing, control the display to turn off, and control the driver to initiate rotation of the first light transfer member to the second position.

According to an embodiment, the at least one processor may be configured to control the display to turn on for the designated period of time when the first light transfer member reaches to the second position.

Methods based on the embodiments disclosed in the claims and/or specification of the disclosure can be implemented in hardware, software, or a combination of both.

When implemented in software, computer readable recording medium for storing one or more programs (i.e., software modules) can be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the disclosure.

The program (i.e., the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program can be stored in a memory configured in combination of all or some of these storage media. In addition, the configured memory can be plural in number.

Further, the program can be stored in an attachable storage device capable of accessing the electronic device through a communication network, such as the Internet, an Intranet, a Local Area Network (LAN), a Wide LAN (WLAN), or a Storage Area Network (SAN) or a communication network configured by combining the networks. The storage device can have an access to a device for performing an embodiment of the disclosure via an external port. In addition, an additional storage device on a communication network can have an access to the device for performing the embodiment of the disclosure.

In the aforementioned specific embodiments of the disclosure, a component included in the disclosure is expressed in a singular or plural form according to the specific example embodiment proposed herein. However, the singular or plural expression is selected properly for a situation proposed for the convenience of explanation, and thus the disclosure is not limited to a single or a plurality of components. Therefore, a component expressed in a plural form can also be expressed in a singular form, or vice versa.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a display including a light source configured to emit light;
   a first light transfer member located on a first optical path of the light, the first light transfer member configured to selectively transfer the light of the first optical path to a second optical path or a third optical path;
   a driver configured to drive the first light transfer member;
   a second light transfer member disposed on the second optical path and transferring light incident via the second optical path to the outside of the electronic device; and
   a third light transfer member disposed on the third optical path and transferring light incident via the third optical path to the outside of the electronic device,
   wherein the second optical path and the third optical path are substantially symmetrical with respect to the first optical path.

2. The electronic device of claim 1,
   wherein the first light transfer member rotates to a first position to transfer along the second optical path the light transferred to the first light transfer member, and
   wherein the first light transfer member rotates to a second position to transfer along the third optical path the light transferred to the first light transfer member.

3. The electronic device of claim 2, wherein the first light transfer member reciprocally rotates between the first position and the second position by means of the driver.

4. The electronic device of claim 3, wherein rotation of the first light transfer member is interrupted for a designated time when the first light transfer member reaches the first position or the second position.

5. The electronic device of claim 4,
   wherein a reciprocating frequency for rotating the first light transfer member between the first position and the second position is associated with a refresh rate of the display, and
   wherein the refresh rate includes a range greater than or equal to 60 Hz.

6. The electronic device of claim 2,
   wherein the first light transfer member rotates to a third position to transfer along the second optical path the light transferred to the first light transfer member,
   wherein the first light transfer member rotates to a fourth position to transfer along the third optical path the light transferred to the first light transfer member, and
   the first light transfer member rotates by means of the driver.

7. The electronic device of claim 6, wherein rotation of the first light transfer member is interrupted for a designated time when the first light transfer member reaches the first position, the second position, the third position, or the fourth position.

8. The electronic device of claim 1,
   wherein light transferred to the outside of the electronic device through the second light transfer member and the third light transfer member is transferred in a direction associated with eyes of a user, and
   wherein the light transferred to the outside of the electronic device produces a stereoscopic image.

9. The electronic device of claim 1,
   wherein the display operates when the first light transfer member is located at a designated position, and
   wherein operation of the display is interrupted when the first light transfer member rotates.

10. The electronic device of claim 1,
    wherein the display includes a Liquid Crystal on Silicon panel (LCoS panel),
    wherein the light source of the display faces the LCoS panel, and
    wherein the first light transfer member is disposed between the LCoS panel and the light source of the display.

11. The electronic device of claim 10, wherein a polarizing plate is disposed between the light source and the first light transfer member.

12. The electronic device of claim 1, wherein a distance in which the light emitted from the light source travels to the outside of the electronic device via the second optical path is substantially the same as a distance in which the light emitted from the light source travels to the outside of the electronic device via the third optical path.

13. The electronic device of claim 1, wherein the first light transfer member includes a polarizing plate.

14. The electronic device of claim 1, further comprising:
    at least one pair of lenses disposed in the second optical path or the third optical path.

15. The electronic device of claim 1,
    wherein the second light transfer member completely reflects light emitted from the light source and incident on the second light transfer member via the second optical path to the outside of the electronic device, or
    wherein the third light transfer member completely reflects light emitted the light source and incident on the third light transfer member via the third optical path to the outside of the electronic device.

16. The electronic device of claim 15,
    wherein the second light transfer member or the third light transfer member includes an optical element configured to guide light received via the first light transfer member to a reflector configured to reflect the light received via the first light transfer member to the outside of the electronic device,
    wherein the optical element is disposed on a first end of the second light transfer member or the third light transfer member, and
    wherein the reflector is disposed on a second end of the second light transfer member or the third light transfer member.

17. An electronic device comprising:
    a display including a light source configured to emit light;
    a first light transfer member located on a first optical path of the light and transferring the light of the first optical path to a second optical path or a third optical path;
    a driver configured to selectively rotate the first light transfer member;
    a second light transfer member disposed on the second optical path changed by the first light transfer member and transferring light incident via the second optical path to the outside of the electronic device;
    a third light transfer member disposed on the third optical path changed by the first light transfer member and transferring light incident via the third optical path to the outside of the electronic device; and
    at least one processor, electrically coupled with the driver and the display, the at least one processor being configured to control an operation of the driver and the display.

18. The electronic device of claim 17, wherein the at least one processor is further configured to:

control the driver to rotate the first light transfer member to a first position such that light transferred to the first light transfer member is transferred along the second optical path, and control the driver to rotate the first light transfer member to a second position such that light transferred to the first light transfer member is transferred along the third optical path.

19. The electronic device of claim 18, wherein the at least one processor is further configured to:
   control the display to turn on for a designated period of time when the first light transfer member is rotated to the first position, and
   in response to the designated period of time elapsing:
      control the display to turn off, and
      control the driver to initiate rotation of the first light transfer member to the second position.

20. The electronic device of claim 19, wherein the at least one processor is further configured to control the display to turn on for the designated period of time when the first light transfer member reaches the second position.

* * * * *